July 28, 1942.  R. W. CARSON  2,290,940
APPARATUS FOR MAKING PRESSURELESS MEASUREMENTS
Filed May 19, 1939  7 Sheets-Sheet 3

INVENTOR
Robert W. Carson
BY
A. D. T. Libby
ATTORNEY

Patented July 28, 1942

2,290,940

UNITED STATES PATENT OFFICE 2,290,940

APPARATUS FOR MAKING PRESSURELESS MEASUREMENTS

Robert W. Carson, Little Falls, N. Y.

Application May 19, 1939, Serial No. 274,522

11 Claims. (Cl. 33—164)

This invention relates to apparatus for making pressureless measurements.

The usual instrument for measuring thicknesses or diameters of materials has been the hand-micrometer, but such an instrument applies pressure to the work in order to determine the "feel" of the instrument. The actual contact pressure used varies with the individual making the measurements and where the parts are small or of soft and flexible material, the pressure will usually cause considerable deformation before the operator's sense of touch responds.

Other gauging instruments, besides the micrometer, use differing contact pressure upon the work at each inspection operation, resulting in non-uniform gauge readings and tolerance variations. Dial gauges and other instruments depending upon mechanical magnification through a multiplicity of gears, racks, pinions, and the like, have numerous points of wear and sources of error, particularly when one instrument must be used over a wide range of operation.

In my Patent 2,005,887, issued June 25, 1935, I have described and broadly claimed a type of micrometer which is used in connection with an electronic circuit. Since the said patent discusses, at some length, the theory of operation which is generally applicable to my present application, the theoretical details will therefore not be described herein. Suffice it to say that the present application has for its object the disclosure of practical means for applying the theoretical principle set forth in my above-mentioned patent.

It may be said, however, that I have found from experience with this type of apparatus that the circuit arrangement and structures shown in my present application are far superior to those shown in Figure 1 and Figure 2 of the said patent. The principal difficulty with the grid-glow tube, which I used in the experiments leading up to said patent, was that the intensity of its glow discharge varied with the contact resistance in the control circuit; thus it was necessary for the operator to estimate the intensity of the discharge and to adjust the micrometer tip in each instance to attain the same discharge intensity. Attempts to use a resistance of more than 200,000 ohms in the control circuit often lead to variations in tube operation as well as variations in repeated readings. An extremely sharp point was necessary on the micrometer tip in order to penetrate high resistance surface films that are often found on metallic parts, and this sharp point was subject to wear and damage through overrunning the measuring point. Furthermore, some pitting invariably occurred which damaged the sharp point and made frequent dressing of the micrometer tip necessary. In order to observe the discharge of a grid-glow tube, it was necessary to so mount the tube that it could be viewed from its top, necessitating the use of a mirror above the vertically mounted tube, obviously an impractical method to apply to a production measuring device.

In addition to these disadvantages of the circuit itself, experience soon taught that the instrument structure, including the block of insulating material which was the main support for the micrometer, lacked sufficient rigidity to accomplish practical results. With the micrometer dial mounted directly on the micrometer head as shown in the patent referred to above, pressure of the operator's hand on the micrometer head or dial caused shifting of the structure and an error in measurement. The attempt to eliminate this difficulty by the use of the thread drive shown in Figure 1 of the above patent was not satisfactory.

The method shown in Figure 3 of Patent No. 2,005,887 for measuring non-conducting materials, did not prove satisfactory principally because of the large area of contact and the relatively high pressure induced by such means on the work when contact areas were made small as desired.

The structure of the said patent failed to give satisfactory results on a number of measuring problems because of the necessity of using a sharp contact point required by the circuit of Figure 2.

I have found, from extensive tests and investigation, that because of the extremely high contact circuit resistance utilized in the measurements, great care must be exercised in the selection of components and in insulating the electrical contacts used in the micrometer apparatus per se, so as to minimize leakage, in order that a special output or detector tube utilized in the electronic circuit can be made sufficiently reliable for operation under varying conditions of temperature and humidity, and the apparatus to be herein described will require no more care than is needed for any other precision-measuring tool.

My improvements will be readily appreciated by one skilled in this art, from the following description wherein:

Figure 7 is a fragmentary view of the lower arm of the apparatus shown in Figure 1, but with a modified form of rider and associated apparatus for measuring the diameter of hair, thin filaments, fine wire, and the like.

Figure 1:
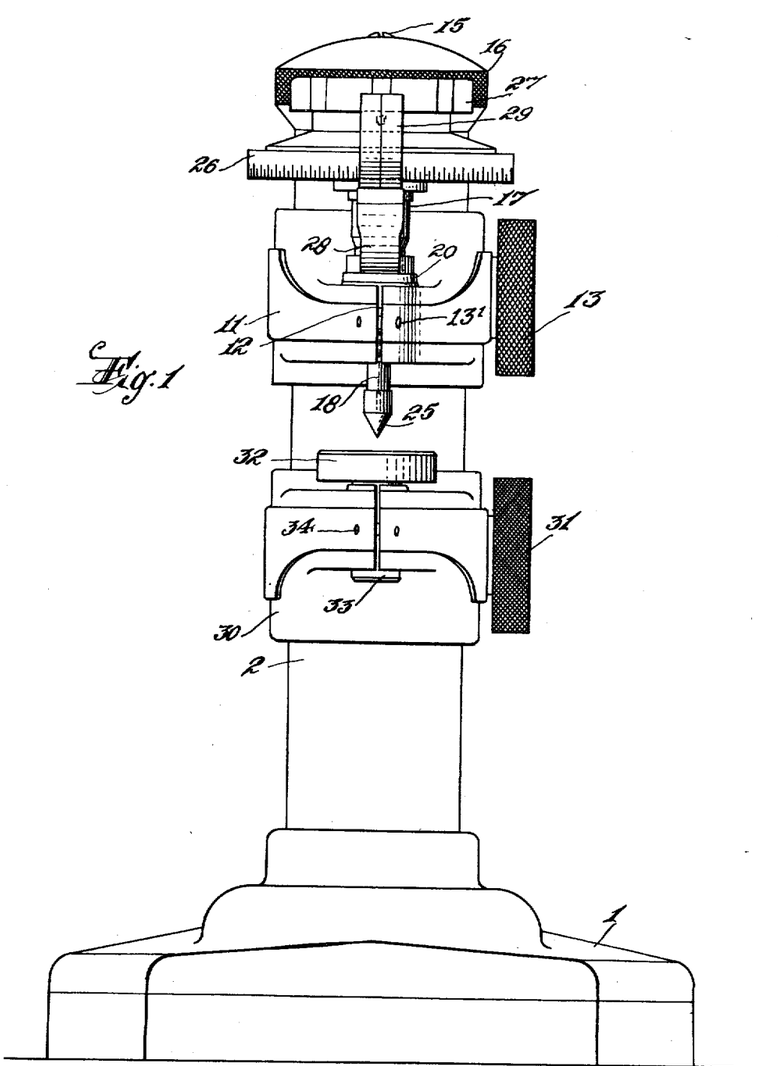
Figure 1 is an elevational view of one form of my improved apparatus.
Figure 2:
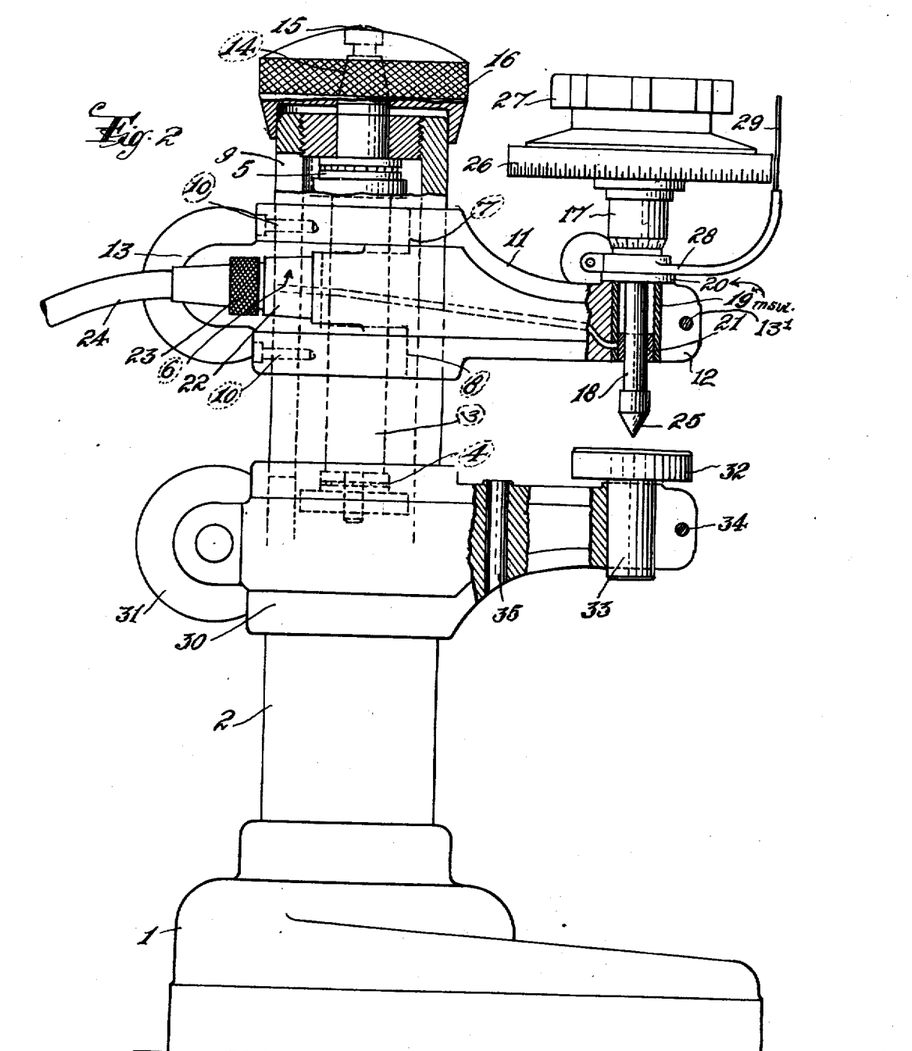
Figure 2 is a side view of Figure 1, certain parts being broken away to shown certain details of construction.

The construction shown in Figures 1 and 2 is that of a commercial apparatus satisfactory for many uses, certain of which will be described. This apparatus includes a metallic base 1 of substantial area having rigidly fastened thereto a vertically extending standard 2. At least the upper end of the standard 2 is preferably hollow to receive a shaft 3 mounted within the hollow portion on anti-friction bearings 4 and 5. The shaft 3 is threaded between the bearings 4 and 5 to support a carrier 6 which, in the form shown, has spaced arms 7 and 8 which are threaded to cooperate with the threads on the shaft 3.

One edge of the carrier 6 projects through a slot 9 to prevent the carrier 6 from turning, and fastened to the carrier, by means of screws 10, is an arm 11 which has a split portion to receive a binding screw 13 which clamps the arm 11 in any adjusted position. Attached to the upper end of the shaft 3, as by means of a tapered surface 14 and set screw 15, is a knurled head 16 used for turning the shaft 3 for adjusting the arm 11 so as to accurately set the micrometer screw, to be later referred to, to its zero position. The threads on the shaft 3 are of a sufficiently fine pitch so that the arm 11 may be raised or lowered .050" for each revolution of the knurled hand-wheel 16.

Mounted on the free end of the arm 11 is a micrometer device 17 having a spindle 18 insulated from the arm 11 by a bushing 19 and insulating washer 20. The bushing 19 and washer 20 may be made all in one piece. Positioned in the bushing 19 is a stationary sleeve 21 forming a part of the micrometer and through which the spindle 18 projects. The arm 11 is hollow and preferably provided with a boss 22 with an attachment device 23 for holding an electrical cable 24 in position. The cable or conductor passes through the arm and through a hole in the insulating bushing 19 and is soldered fast to the sleeve 21. The lower end of the spindle 18 is preferably provided with a removable, hardened and ground steel tip or point 25. In some cases, however, as will be later referred to, this point may be replaced by one of another shape.

Carried on the upper end of the spindle 18, but insulated therefrom, is a dial 26 having 250 divisions, each division being equal to .0001". Attached to the spindle in any satisfactory manner, is a dial knob or hand-wheel 27 of insulating material. A dial reading device 28 is mounted for arcuate movement on the stationary shell of the micrometer and is provided with a reference line 29 for assistance in reading the scale on the dial 26. The free end of the arm 11 is split at 12 and provided with a locking screw 13' to draw the split ends together for the purpose of clamping a suitable insulator 19 to grip the sleeve 21 of the micrometer in order to hold the micrometer device securely on the arm 11.

The standard 2 carries a lower arm 30 which is clamped by a screw 31 to any given set position. The arm 30 is slidable up and down on the standard 2, as well as being rotatable thereabout. The free end of the arm 30 carries a support member having a hardened and lapped surface plate 32, and a stem 33 which has some vertical adjustment in the end of the arm which is split and provided with a set screw 34 to clamp the stem 33 in adjusted position. The arm 30 is also provided with a hole or orifice 35 to receive the mounting member of a rider.

Figure 3:
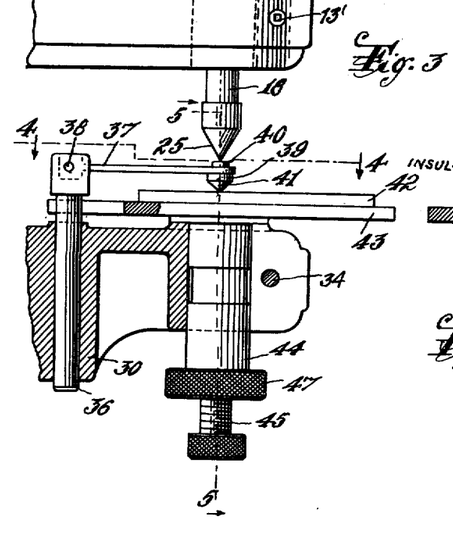
Figure 3 is a fragmentary view, part in elevation and part in section, of the support arms shown in Figures 1 and 2, and including means for measuring the thickness of non-conducting materials.
Figure 4:
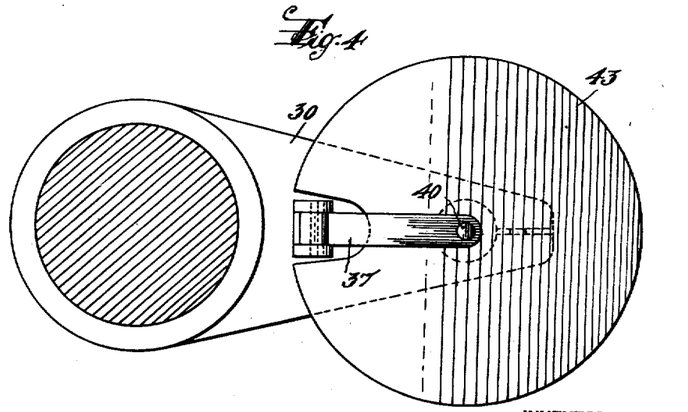
Figure 4 is a view on the line 4—4 of Figure 3, but showing more of the column for carrying the support arms than is shown in Figure 3.
Figure 5:
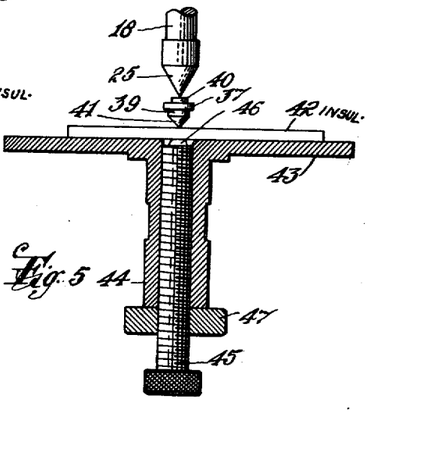
Figure 5 is a part-elevational and part-sectional view on the line 5—5 of Figure 3.

When it is desired to measure the thickness of non-conducting materials, such as cork, hard rubber, paper and similar objects, I use an attachment referred to herein as a rider. This rider has a stud 36 fitting the hole 35. To the stud 36 is pivoted a lever 37 at the point 38. The stud 36 may be raised and lowered in the arm 30, if necessary, and held in this adjusted position by a suitable set screw. The lever 37 of the rider carries a contact member 39 having a flat surface 40 in juxtaposition to the conical contact member 25 carried by the spindle 18. The contact 39 is provided with a conically shaped point 41 to engage a piece 42 of insulating material, the thickness of which is desired to be measured. The piece 42 is carried by a plate member 43 having a stem 44 positioned in the end of the arm 30. The stem 44 supports a screw member 45 terminating in a ball point 46 that is preferably raised very slightly above the plate 42 and locked in this position by a lock-nut 47.

In operating the attachments shown in Figures 3, 4 and 5, the micrometer is adjusted to zero, with no material under the rider lever 37 and its contact 39, so that the point 41 rests in contact with the ball point 46. Then the micrometer screw is raised by turning it in the proper direction and the material to be measured is inserted under the rider, and the micrometer then set to the point of virtual contact with the rider. If necessary the lever 37 may be provided with a counterweight as will be later described, so that the pressure of the rider on the material can be made as low as a very few milligrams, of the order of ten or even less, so that substantially no pressure is applied by the rider to the material being measured. The indication given by bringing the contact 25 down into juxtaposition to the surface 40 of the contact member 39 of the rider will be later referred to in the brief general description of the electronic circuit which is used with the apparatus.

Figures 6, 8, 9:
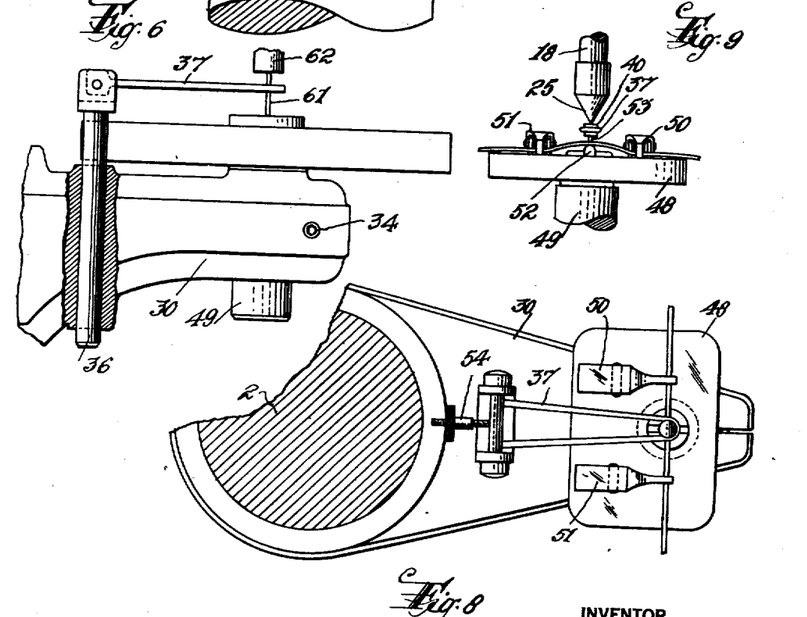
Figure 6 is a fragmentary view of the lower support arm of the apparatus, showing a modified form of rider engagement.
Figure 8 is a plan view of Figure 7.
Figure 9 is an end view on the line 9—9 of Figure 7.
Figure 7:
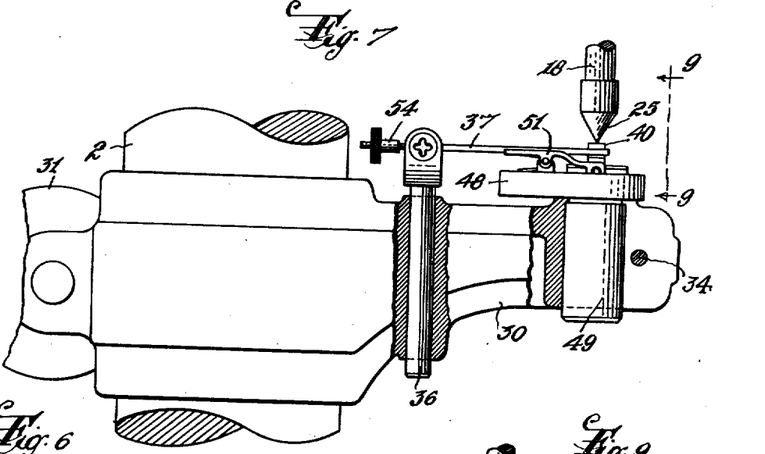

In Figures 7, 8 and 9, I have shown attachments for measuring human hair, fine wire or similar objects. For this purpose I provide a support plate 48 carried on the stud 49 held in adjusted position on the end of the arm 36. The plate 48 carries a pair of pivotally mounted guide and holding members 50 and 51 on opposite sides of the lever 37 of the rider, which guide members have their notched ends spring-pressed against the support plate 48. The object being measured rests against a cylindrically shaped surface 52 and a cooperating cylindrically shaped surface 53 forming part of the contact member on the lever 37 of the rider. The axes of the two contacts 52 and 53 are at right angles to the axis of the object being measured. An adjustable counterweight 54 is carried by the rider lever 37 so as to get substantially zero contact pressure of the contact 53 against the object to be measured. As in Figures 3, 4 and 5, the upper contact surface 40 of the rider lever 's flat to cooperate with the conical point 25 on the spindle 18.

Figure 10:
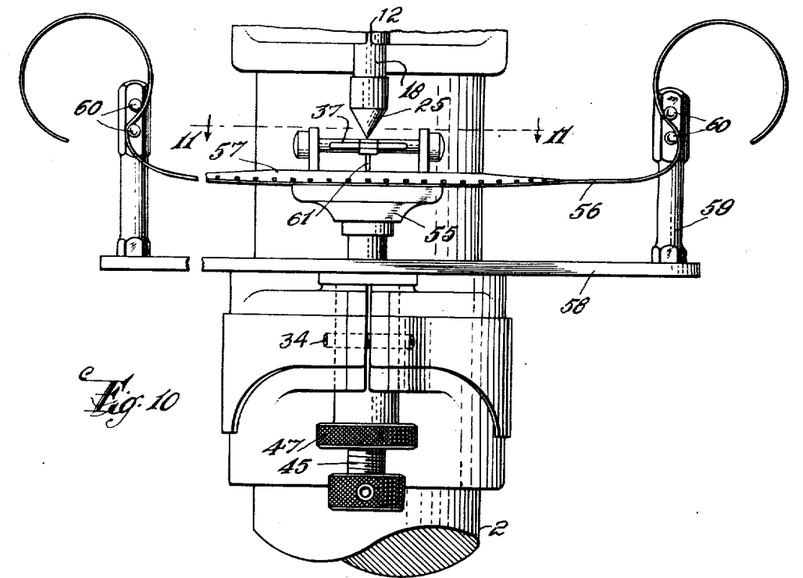
Figure 10 is an end view of the measuring apparatus, showing a modified form of rider satisfactory for measuring the curvature of a film.
Figure 11:
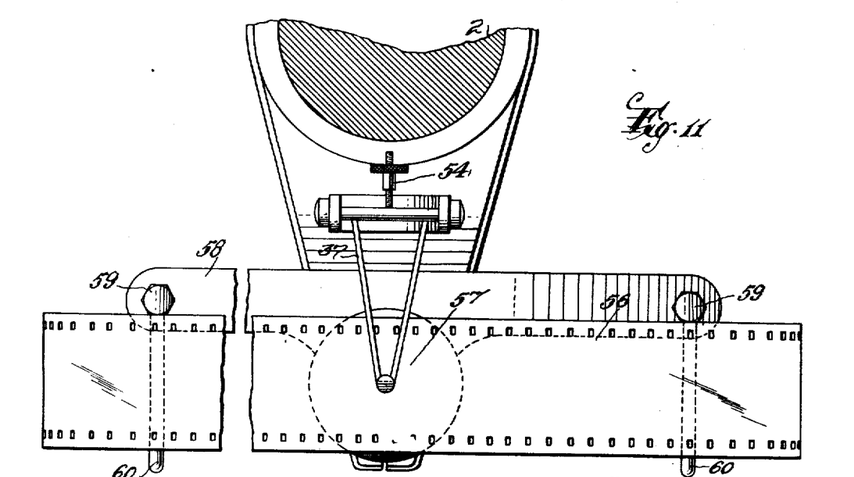
Figure 11 is a plan view of Figure 10.
Figures 12, 15:
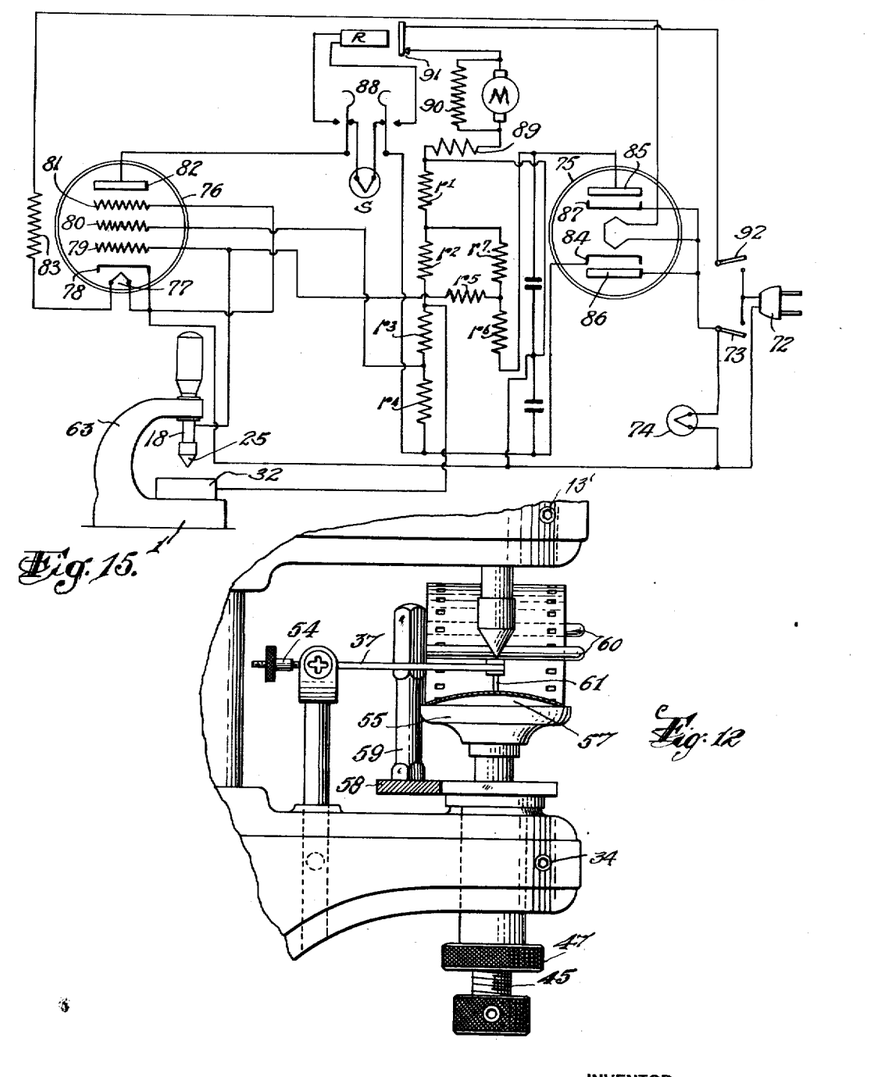
Figure 12 is an end view of Figure 10, looking from right to left.
Figure 15 is a diagrammatic view of a circuit arrangement which I have found satisfactory for use with the apparatus herein described.

In Figures 10, 11 and 12, I have shown attachments for measuring the transverse curvature of a photographic film. The action of a film as it goes through the camera at high speed is dependent on the curvature of the film and unless this curvature is of the proper amount, the action of the film in passing from one reel to the other is affected. Consequently it is essential to measure this curvature to see that it is of the proper amount. In these Figures a screw stud 45, similar to that shown in Figure 5, is used in the upper end of which is carried a support member 55, across the surface of which the film 56 is passed, the curvature being indicated at 57 in Figures 10 and 12.

In these forms the rider lever 37 is shaped about the same as in Figure 8, and the micrometer contacts are about the same as shown in Figure 9. Below the support member 55 a holder is provided consisting of a plate 58 carried on the main support and at each end of which is mounted a stud 59, to the upper end of which is fastened a pair of pins 60 which extend at right angles to the stud or parallel to the plane of the film. By this arrangement the film may be drawn through the holder and measurements of its curvature made without applying any pressure to the film.

Figure 13:
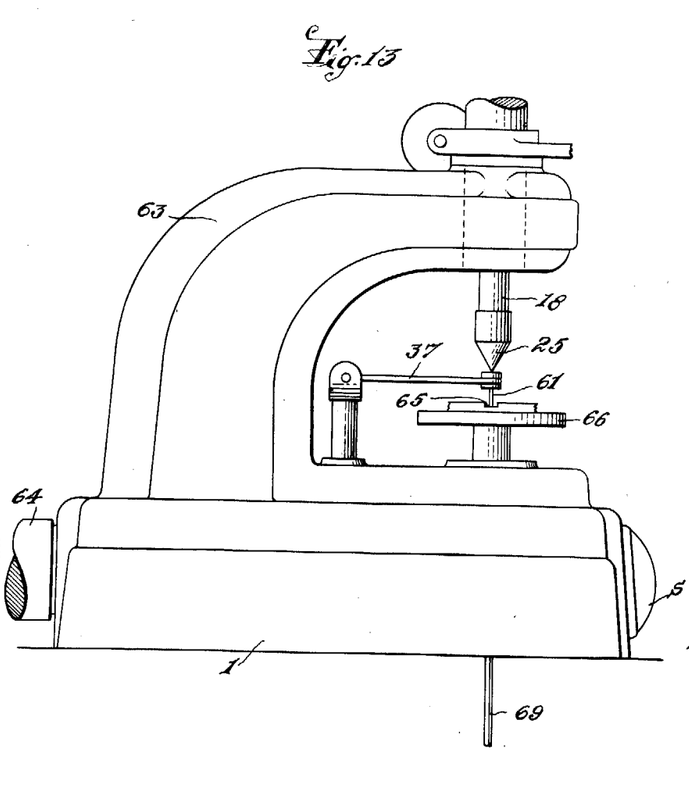
Figure 13 is a side elevation of a modified form of apparatus, particularly useful in the measuring of jewels.
Figure 14:
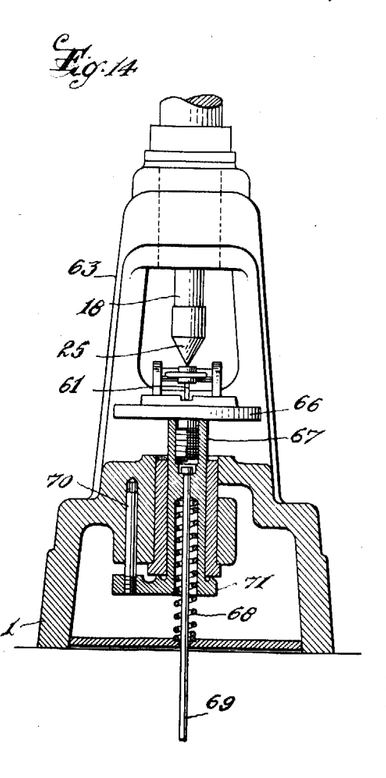
Figure 14 is an end view of Figure 13, looking from right to left.

In Figures 6, 13 and 14, there are shown attachments for measuring jewels such as are used for bearings in watches and electrical measuring instruments. In Figure 6, the rider lever 37 carries a double-ended somewhat cylindrically shaped contact member 61, while the micrometer tip 25 is replaced by a tip 62 having a flat surface. In Figures 13 and 14 the apparatus comprises a single-piece cast frame having a hollow arm 63 extending upwardly and over the base portion 1, but the micrometer mounting thereon is the same as has been described with respect to Figures 1 and 2. The incoming conductor is brought through the cable 64 and preferably extends upwardly through the arm 63 and con- tacts with the spindle 18 as in Figure 2. In this case the rider lever 37 has a contact member similar to that shown in Figure 12, in which the contact 61 is elongated in shape to extend into a recess 65 for receiving the jewel, or into the recess in the jewel itself.

As shown more particularly in Figure 14, the support plate 66 is carried on a plunger 67 held in its upward position by a spring 68. A lever 69, which may be operated by hand or foot, is used for depressing the plunger 67 so as to facilitate the entry of the jewels in place on the support 66. The plunger 67 is prevented from turning by a pin 70 fastened to a flange 71 that is either integral or securely attached to the plunger 67. The flange 71 also limits the upward movement of the plunger. Mounted in the base 1 is a signal light S to which reference will be made in connection with the description of the circuit arrangement.

As stated in the early part of this specification, the general theory of operation of this electronic micrometer is set forth in my Patent 2,005,887. However, I have found from experience with the apparatus that the circuit arrangement as shown in Figure 15 hereof is far superior to that shown in Figure 2 of the said patent. To obtain the desired stability in operation and to eliminate the undesirable effects of humidity and temperature conditions upon leakage, it is necessary to take extreme precautions in insulating the contact circuit in the manner as has been heretofore described. Also, the internal resistance of the electronic tubes must be kept extremely high, and the tube output with contacts open must be negligible in order to give a positive indication of contact juxtaposition. These features make it necessary to use special electronic tubes as shown in Figure 15, and special shielding and insulation on that part of the tube circuit leading to the contact points.

In Figure 15 I have shown a diagram illustrating the electrical apparatus used in carrying my invention into practice. In this figure 72 is a plug adapted to be connected into any satisfactory source of alternating current such as a 110-volt house-lighting circuit, the circuit being controlled by a switch 73. A small pilot light 74, which may be of the neon type, is preferably used to indicate that current is present on the instrument. 75 is a voltage-doubler rectifier tube for converting in conjunction with the filter condensers the alternating current into pulsating DC current for feeding the tube 76 which is of an amplifier type, having a filament 77 and cathode 78 with grids 79, 80 and 81, and a plate 82. It will be seen that the filaments for the tubes 75 and 76 are in series through a resistance 83 direct from the source of current supply. A voltage control means including resistances r1 to r7 is fed from the tube 75 to provide the necessary voltage required for the desired operation of tube 76, as governed by the micrometer apparatus. A tap between the resistances r2 and r3 is connected to the frame 1 of the instrument, while the resistor r5 and grid 79 are connected to the insulated metal bushing or contact collar 21 of the micrometer. The output circuit from the plate 82 to the tube 76 is connected to a signal lamp S through a switch 88 and back to the cathode 84 of the tube 75.

In operation, when the micrometer, the spindle of which has a very slow downward movement, is brought into juxtaposition to the surface being measured, or to the rider lever contact, where the piece being measured is of insulating material, the action at the micrometer is such as to short-circuit the resistances r2 and r5, thereby changing the potential on the grids 79 and 69, which allows current to flow from the cathode 78 and the plate 82 through the switch 88 and signal lamp S, to the other side of the circuit, thereby notifying the operator of the micrometer that a pressureless contact has been made, and the setting of the micrometer at this instant is the reading to be taken.

While the structure described is for hand operation, the micrometer spindle may be operated by a motor M which is shown as compound-wound, having a series field 89 and a shunt field 90 that is controlled by a very sensitive relay R having a back contact 91 connected to the other side of the circuit through a switch 92. When the motor is being used, the switch 88 is thrown to a position so as to connect the relay R across the output circuit of the tube 76 so that when the micrometer spindle is turned downwardly into juxtaposition with the stationary contact on the rider, or in juxtaposition to the piece, the thickness of which is to be measured, the relay R will be operated, thereby breaking the motor circuit. Preferably the motor is equipped with a brake, not shown, which goes on instantaneously and stops the motor. It will be understood of course that the motor is connected through a reduction drive of any satisfactory kind so that with the opening of the circuit and the application of the brake, there will be no overrun of the motor which would tend to produce a slight pressure at the contacts. Means for reversing the motor may also be used.

From what has been said it will be obvious that various changes may be made in the attachments and other details of the apparatus, without departing from the spirit of my invention or the scope of the appended claims; for example, the micrometer with its dial, if a dial is used, may be replaced by a fixed member carrying one or more individually adjustable contact members set so that an article, placed on the work-support plate, may be quickly gauged between maximum and minimum limits; that is to say, one of the contact members set for the maximum limit and the other for the minimum limit, or, in the parlance of the mechanic, a "go" and "no-go" gauge.

While I have indicated the micrometer as being insulated from its support arm, it is obvious that the rider on the work surface support may be insulated; or both may be insulated, if found necessary, although I have found it more convenient to insulate the micrometer for most purposes.

What I claim is:

1. An apparatus for making pressureless measurements including, a base, a standard projecting upwardly from the base, a pair of arms carried by the standard and being relatively adjustable with respect to each other, the adjustment of the upper arm comprising a shaft mounted preferably on anti-friction bearing positioned in spaced relation within the upper portion of the standard, said shaft being threaded between the bearings and having a carrier positioned on said threaded portion of the shaft, means for non-rotatably anchoring the carrier to the arm and operating means on the outer end of the shaft for turning it, a micrometer device carried by the upper of said arms and having a spindle extending through the arm but insulated therefrom, means for making suitable electrical connection to said spindle, and means carried by the lower of said arms for supporting the article to be measured and electronic means connected between said spindle and said means carried by the lower of said arms, the current across the spindle and said means being so small as to substantially eliminate pitting of the contacts.

2. An apparatus for making pressureless measurements including, a base, a standard projecting upwardly from the base, a pair of rigid metallic arms carried by the standard and being relatively adjustable with respect to each other, a micrometer device carried by the upper of said arms and having its spindle extending through but insulated from the end of the arm, a metallic contact member within the insulator for directly engaging the spindle, and means extending through the arm for carrying current to the said contact member, said micrometer having a dial of enlarged diameter with graduations on its edge to read in ten-thousandths of an inch, and an adjustable contact member on the lower arm for carrying the piece to be measured and electronic means connected between said spindle and said contact member on the lower arm, the current across the spindle and said contact being so small as to substantially eliminate pitting at the contacts.

3. An apparatus for making pressureless measurements including, a base, a standard projecting upwardly from the base, a pair of rigid metallic arms carried by the standard and being relatively adjustable with respect to each other, a micrometer device carried by the upper of said arms and having its spindle extending through but insulated from the end of the arm, a metallic contact member within the insulator for directly engaging the spindle, and means carried by the arm for carrying current to the said contact member, said micrometer having a dial of enlarged diameter with graduations on its edge to read in ten-thousandths of an inch, means for setting the micrometer dial to zero at a position in front of the operator preparatory to taking measurement, said means including a shaft rotatably carried within the upper end of the standard with means for turning the shaft, the shaft having a suitable thread with a carrier non-rotatably mounted on the thread but fastened to the arm carrying the micrometer device, and means on the lower arm for supporting the piece to be measured and electronic means connected between said spindle and said means carried by the lower of said arms, the current across the spindle and said means being so small as to substantially eliminate pitting of the contacts.

4. An apparatus for making pressureless measurements including, a base, a standard projecting upwardly from the base, a pair of rigid metallic arms carried by the standard and being relatively adjustable with respect to each other, a micrometer device carried by the upper of said arms and having its spindle extending through but insulated from the end of the arm, a metallic contact member within the insulator for directly engaging the spindle, and means carried by the arm for carrying current to the said contact member, said micrometer having an insulated dial of enlarged diameter with graduations on its edge to read at least as fine as ten-thousandths of an inch, a knob preferably of insulating material for operating the dial, the upper arm being adjustable only in a vertical direction, while the lower arm can be adjusted in both a vertical and rotary direction, and means on the lower arm for supporting the piece to be measured and electronic means connected between said spindle and said means carried by the lower of said arms, the current across the spindle and said means being so small as to substantially eliminate pitting of the contacts.

5. An apparatus for making pressureless measurements of materials, including a rigid metallic arm with a support therefor, a micrometer device carried by the arm and having a spindle extending through but insulated from the arm, an electrical conductor forming one terminal of an electronic circuit with means for electrically connecting said conductor to the spindle, a support for the article to be measured, a metallic rider with means for supporting it, and a lever forming part of the rider pivotally attached thereto and extending over the said article and provided with a contact member adapted to cooperate with the tip of said spindle, the latter being of the type whereby the pressure of the rider on the material can be made of the order of a few milligrams the rider being electrically connected to the other side of said electronic circuit, and means associated with the micrometer device for indicating the setting thereof.

6. An apparatus for making pressureless measurements as set forth in claim 5, further characterized in that means are provided for counterbalancing the rider lever so the contact pressure of the lever on the article is extremely light, not in excess of ten milligrams.

7. An apparatus for making pressureless measurements as set forth in claim 5, further characterized in that when the object to be measured is a hair, fine wire or similar object, guide means for guiding the object into place are provided on opposite sides of the lever of the rider, the lever being counter-balanced so as to reduce the contact pressure of the lever contact on the object to substantially zero, while the two contacts which engage the object have cylindrical surfaces of metal that are hardened and lapped and have their axes at right angles to the axis of the object, the spindle tip being pointed and the cooperating contact on the rider lever being flat.

8. Means for measuring the curvature in photographic film including the apparatus as set forth in claim 5, further defined in that an elongated yoke is carried below that part of the support engaged by the film, said yoke having a stud at each end and each stud having a plurality of guide pins extending from the top of the studs parallel to the plane of the film, the lever of the rider being provided with a counterweight so its engagement with the film will not distort the curvature of the film.

9. Means for measuring the depth of a recess in a jewel bearing including the apparatus as set forth in claim 5, further defined in that the rider lever has an elongated contact member, one end of which engages the jewel or hole for the jewel, while the spindle and rider lever contacts have one at least which is flat and the other pointed.

10. An apparatus for making pressureless measurements of non-conducting materials including, a rigid metallic arm with a support therefor, a micrometer device carried by the arm and having a spindle extending through said arm but insulated therefrom, a support for the article to be measured, a metallic rider and means for supporting the same, a lever forming a part of the rider pivotally attached thereto and extending over the said article and provided with a contact member adapted to cooperate with the tip of said spindle, the lever being balanced so its contact member applies substantially zero pressure to the article, means associated with the micrometer device for indicating the setting, means for insulating at least the rider from the spindle, and means for connecting the terminals of an electronic circuit to the spindle and rider.

11. An apparatus for making pressureless measurements including a rigid metallic support arm and a support therefor, a micrometer device carried by the arm and having a spindle extending through the end of the arm but insulated therefrom by a suitable insulating bushing and having a very slow downward movement, and an adjustable contact member carried by the support, for receiving a piece to be measured, positioned in alignment with the axis of the micrometer spindle for measurement of a piece placed between the contact member and the end of the micrometer spindle, and electronic means connected between said spindle and said contact member, said electronic means including a rectifier tube and a tube of the plural grid amplifier type, the tubes being interconnected by a voltage divider made up of a plurality of resistors, certain of which are connected to the micrometer cooperative contacts, one of said contacts being connected to the control grid of the amplifier tube, while another of said grids is connected into the voltage divider so as to be simultaneously affected along with the control grid by the micrometer contacts, the internal resistance of the amplifier tube being very high and the said grids, in cooperation with their respective resistances in the voltage divider, having a sensitivity such that the current across the cooperative contacts of the micrometer is so small as to substantially eliminate pitting thereat, and yet such as to cause the plate current to give a positive and instantaneous indication that the micrometer spindle contact has been brought into juxtaposition with the piece or cooperating contact and that the setting of the micrometer at this instant is the reading to be taken, the pressure being so light as to eliminate all deformation of the piece being measured.

ROBERT W. CARSON.

CERTIFICATE OF CORRECTION.

Patent No. 2,290,940.  July 28, 1942.

ROBERT W. CARSON.

It is hereby certified that the residence of the inventor in the above numbered patent was erroneously described and specified as "Little Falls, New York" whereas said residence should have been described and specified as --Little Falls, New Jersey--; page 2, first column, line 4, for the word "shown" read --show--; and second column, line 51, for "member 38" read --member 39--; and that the said Letters Patent should be read with this correction therein that the same may conform to the record of the case in the Patent Office.

Signed and sealed this 1st day of September, A. D. 1942.

(Seal)

Henry Van Arsdale,
Acting Commissioner of Patents.